No. 864,640. PATENTED AUG. 27, 1907.
C. W. GOODSMAN.
WHEEL SCRAPER.
APPLICATION FILED DEC. 19, 1906.
2 SHEETS—SHEET 1.
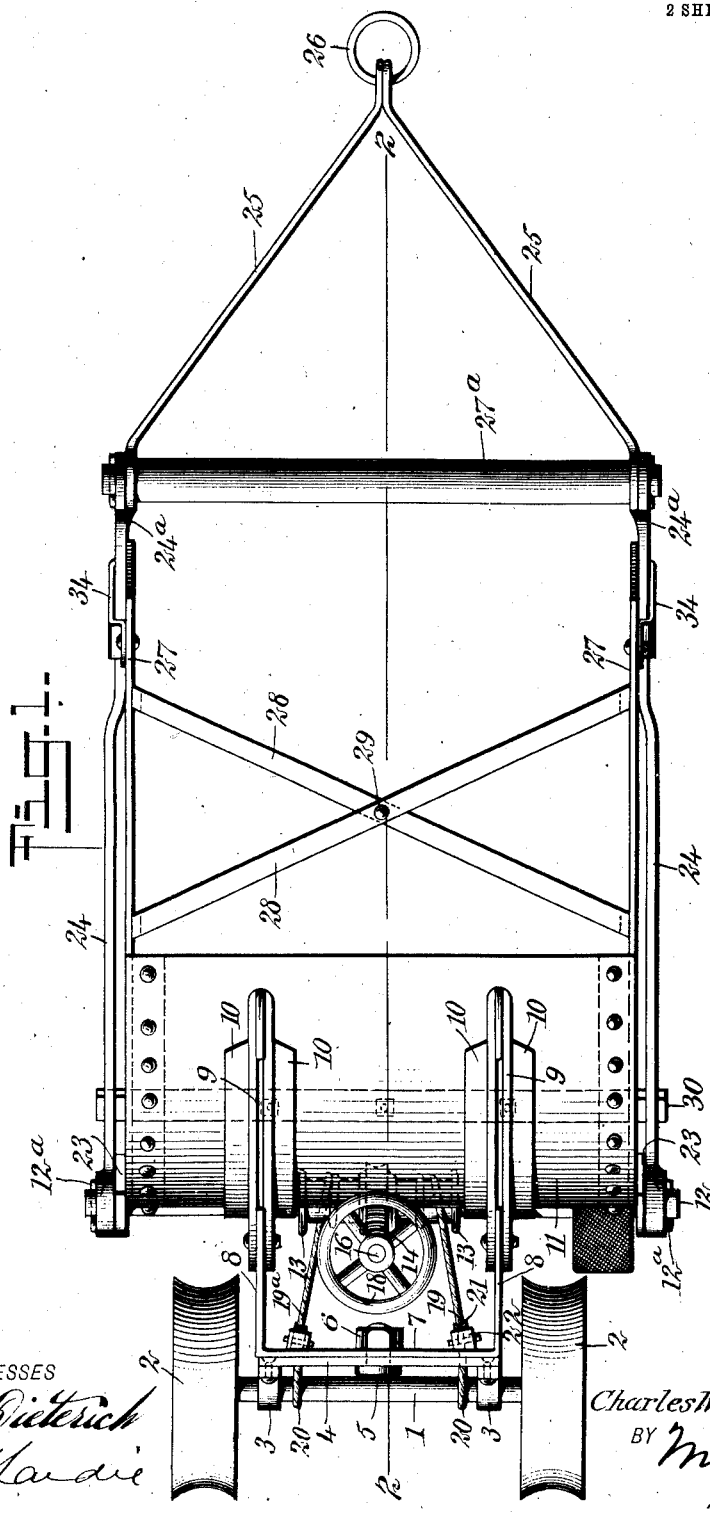
WITNESSES
INVENTOR
Charles W. Goodsman
BY
ATTORNEYS

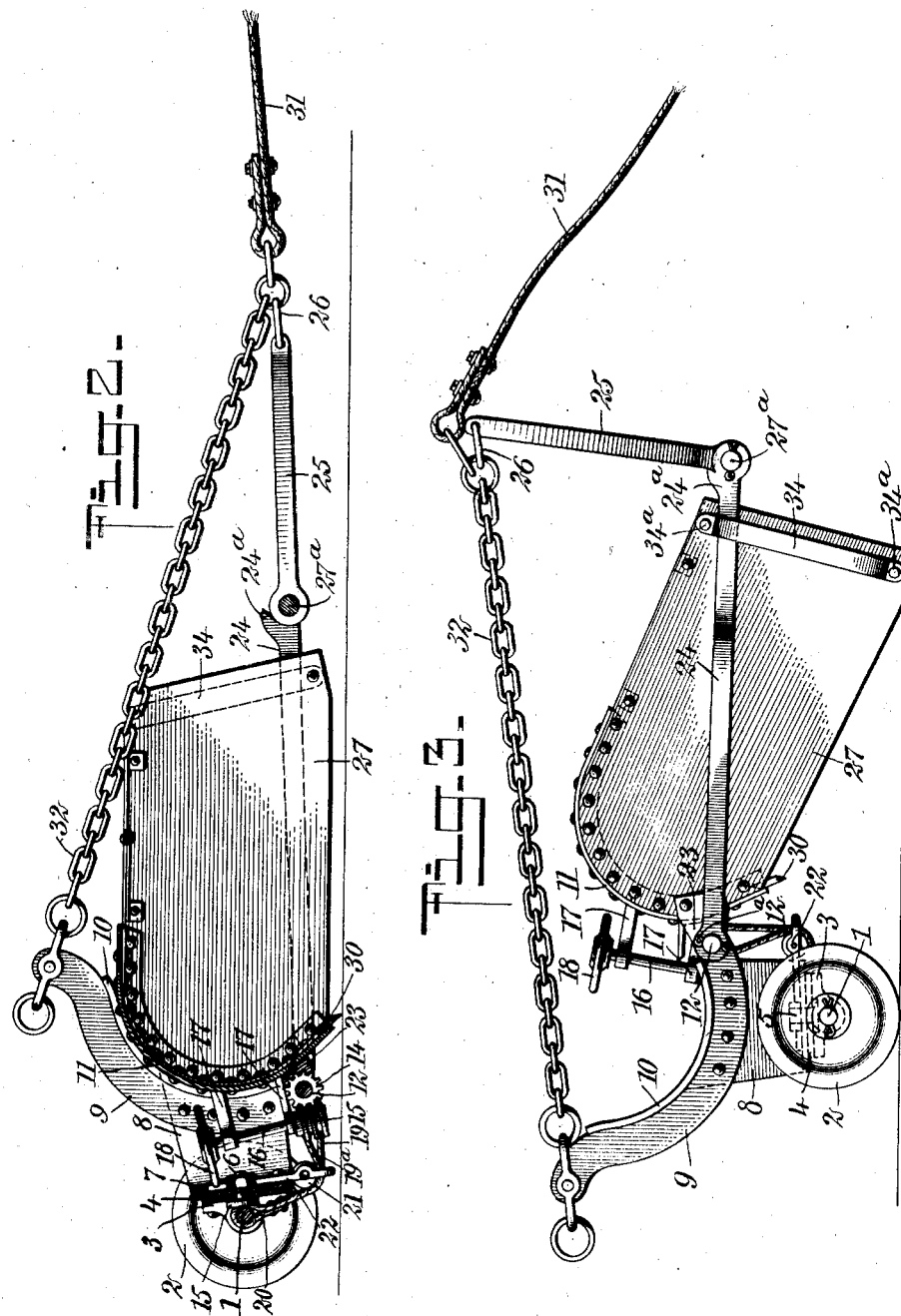

UNITED STATES PATENT OFFICE.

CHARLES W. GOODSMAN, OF ST. JOHNS, OREGON.

WHEEL-SCRAPER.

No. 864,640.    Specification of Letters Patent.    Patented Aug. 27, 1907.

Application filed December 19, 1906. Serial No. 348,534.

*To all whom it may concern:*

Be it known that I, CHARLES W. GOODSMAN, a citizen of the United States, and a resident of St. Johns, in the county of Multnomah and State of Oregon, have invented a new and Improved Wheel-Scraper, of which the following is a full, clear, and exact description.

This invention relates to scrapers mounted on carrying wheels and has for its object to provide a device which is simple in construction, effective in operation, durable in use, and adapted to be readily controlled in its movements. Such objects I accomplish by the means illustrated in the accompanying drawings, in which Figure 1 is a plan of a device embodying my invention; Fig. 2 is a longitudinal vertical section taken on the line 2—2 of Fig. 1; and Fig. 3 is a side elevation of the device shown in Fig. 1, arranged so as to dump the contents of the scraper.

As illustrated in the accompanying drawings, an axle 1 is mounted upon carrying wheels 2 and supports bearing boxes 3 attached to a transverse bar 4. The bar 4 is pivotally connected by means of a king bolt 5 and engaging nut 6 with a main frame, having a transverse bar 7 and side bars 8. The side bars 8 are rigidly attached to fulcrum levers 9 curved on their inner edges, and preferably provided with lateral flanges 10 corresponding in curvature with that of the inner edge of the levers 9 and adapted to bear against the correspondingly curved end 11 of a scoop, which is mounted upon a shaft 12 extending transversely of said scoop and attached at its ends to the inner end of the levers 9, as shown in Figs. 1 and 3.

The transverse shaft 12 is provided with drums 13 arranged on opposite sides of a worm gear 14 fixedly attached to said shaft, and meshing with a worm 15 mounted upon a vertical shaft 16, which shaft is journaled in brackets 17 attached to the curved rear end 11 of the scoop. The vertical shaft 16 and worm mounted thereon are controlled by means of a hand wheel 18 attached to said shaft. The drums 13 are connected with the axle 1 by means of cables 19 and 19$^a$, which extend around the drums 13 from opposite directions, as shown in Fig. 1, whereby as the shaft 12 supporting the drums is rotated by the hand wheel 18 and worm connected therewith, one of the cables will wind and the other unwind on the drums. The rear ends of said cables are formed into loops 20 which engage the axle of the carrying wheels and enable said axle to be steered by the hand wheel 18 so as to guide the scraper laterally to any extent desired.

The cross bar 7 of the main frame is provided with brackets 22, upon which are mounted idle rollers 21 which bear against and guide the cables 19 and 19$^a$ when operated by the hand wheel 18, as hereinbefore described.

Brackets 23 are fixedly attached at one end to the rear end of the scoop 11, and the opposite ends of said brackets are mounted on the transverse shaft 12.

Draft bars 24 are pivotally attached at their rear ends to the shaft 12, and are preferably retained thereon by means of split keys 12$^a$. The forward ends of said draft bars are pivotally attached to a cross bar 27$^a$, to which are attached bail rods 25 connected together at their forward ends in any suitable manner, preferably by means of a draft ring 26.

The forward ends of the draft bars 24 are preferably provided with off-set lugs 24$^a$ adapted to bear against the bail rods 25 and limit the upward movement of said rods relatively to the draft bars.

The forward ends of the draft bars 24 move freely in yokes 34 provided with off-set ends 34$^a$ which are attached to the side plates 27 of the scoop.

The upper ends of the side plates are preferably braced by means of cross rods 28 secured together at their central portion by means of a bolt or rivet 29.

The scoop is provided with a scraping blade 30 which is arranged forward of the shaft 12 to which the rear ends of the draft rods are attached, and when the device is in operation the scoop is arranged as shown in Figs. 1 and 2 with the blade in contact with the ground. When in such position the axle frame and main frame are supported on the back of the scoop, thereby causing the scraping blade 30 to dig firmly into the ground because of the weight of said attachments carried by the scoop. The draft is applied to the scoop by means of a cable 31 connected with the bail rods 25 and draft rods 24, thereby applying the draft directly at the rear of the scraping blade and leaving the forward portion of the scoop free relatively to the draft rods, while the device is in operation. After a sufficient quantity of material has been gathered by the scoop and it is desired to dump the contents thereof, the draft is released from the cable 31 and applied to the free ends of the fulcrum levers 9, which are connected by means of a cable or chain 32 with the bail rods 25. When the draft is so applied to the fulcrum levers 9, the forward ends of the bail rods 25 are raised until said arms come in contact with the lugs 24$^a$ of the draft bars 29; the forward ends of the draft rods are thereby raised, and the free ends of the fulcrum levers 9 drawn backward thereby bringing the carrying wheels 2 in contact with the ground and raising the rear end of the scoop from the ground, the forward end of the scoop being freely connected with the draft bars remains in contact with the ground, as shown in Fig. 3. By means of such operation, the contents of the scoop is readily unloaded, and by releasing the draft from the free ends of the fulcrum levers 9 and applying it to the cable 31, the levers 9 may be again brought over onto the back of the scoop, thereby raising the carrying wheel from the ground and supporting the scoop on the scraping blade 30, when the former scraping operation may be repeated.

Having thus described my invention, what I claim as new and desire to secure by Letters Patent is:

1. A scraper having an axle frame mounted on wheels, a main frame pivotally attached to the axle frame, and a scoop pivotally mounted at its rear end on said main frame, substantially as shown and described.

2. A scraper having an axle frame mounted on wheels, a main frame pivotally connected with said axle frame, a scoop pivotally attached at its rear end to said main frame, and steering mechanism adapted to adjust the axle frame relatively to the main frame, substantially as shown and described.

3. A scraper comprising an axle frame mounted on wheels, a main frame pivotally mounted upon said axle frame, a scoop pivotally attached at its rear end to said main frame, and draft rods pivotally attached to said main frame and freely connected with the forward end of said scoop, substantially as shown and described.

4. A scraper comprising an axle frame mounted on wheels, a main frame pivotally mounted on said axle frame, a scoop hinged at its rear end to the main frame, draft mechanism hinged on the main frame and freely connected to the forward end of said scoop, and steering mechanism adapted to adjust the axle frame relatively to the main frame, substantially as shown and described.

5. A scraper having an axle frame, a main frame pivotally mounted on said axle frame, a scoop provided with a scraping blade, and hinged to said main frame, fulcrum levers fixedly attached to said main frame, draft mechanism connected with said main frame, and means for connecting the free ends of said draft mechanism and fulcrum levers, substantially as shown and described.

6. A scraper having an axle frame mounted upon wheels, a main frame pivotally attached to said axle frame, a scoop pivotally mounted on said main frame and provided with a curved rear end, curved fulcrum levers fixedly attached to the main frame and adapted to bear against the curved end of said scoop, draft rods pivotally attached to the main frame at the rear end of said scoop, yokes attached to the forward ends of said scoop adapted to engage said draft rods, and means for connecting the free ends of said draft rods and fulcrum levers, substantially as shown and described.

7. A scraper having an axle frame mounted on wheels, a main frame pivotally mounted upon said axle frame, a transverse shaft journaled on the main frame, a scoop provided with a scraping blade and mounted on said shaft back of said scraping blade, and mechanism connected with said shaft and axle frame adapted to adjust said axle frame relatively to the main frame, substantially as shown and described.

8. A scraper having an axle frame mounted on wheels, a main frame pivotally mounted on said axle frame and provided with fulcrum levers, a transverse shaft mounted on the main frame, drums mounted on said shaft, cables extending around said drums in opposite directions and connected with said axle frame, mechanism connected with said main frame adapted to rotate said shaft and steer said axle frame, and a scoop hinged to the main frame, substantially as shown and described.

9. In a scraper, the combination with an axle frame mounted on wheels, of a main frame pivotally attached to said axle frame, a transverse shaft connected with the main frame, a scoop hinged to said main frame, a worm gear fixedly secured to said shaft, a worm mounted on the end of said scoop engaging said gear, drums connected with said shaft, and cables connected with said shaft and axle, substantially as shown and described.

10. In a scraper, the combination with an axle frame mounted on wheels, of a main frame pivotally connected with said axle frame and provided with curved fulcrum levers, having lateral flanges extending therefrom, a scoop hinged at its lower rear end to the main frame and provided with a scraping blade, draft bars connected with the main frame back of said scraping blade, means for connecting the end of said draft bars and fulcrum levers, and mechanism adapted to adjust the axle frame relatively to the main frame, substantially as shown and described.

In testimony whereof I have signed my name to this specification in the presence of two subscribing witnesses.

CHARLES W. GOODSMAN.

Witnesses:
CHAS. J. SCHNABEL,
C. BUECHLER.